(12) United States Patent
Madaras

(10) Patent No.: US 7,732,509 B2
(45) Date of Patent: Jun. 8, 2010

(54) POLYMERIC COLORANT-BASED INK COMPOSITIONS

(75) Inventor: Mihaela L. Madaras, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 99 days.

(21) Appl. No.: 11/509,138

(22) Filed: Aug. 24, 2006

(65) Prior Publication Data

US 2008/0122915 A1    May 29, 2008

(51) Int. Cl.
*C09D 11/00* (2006.01)
*G01D 11/00* (2006.01)

(52) U.S. Cl. .................. 523/160; 523/161; 347/100

(58) Field of Classification Search .......... 523/160, 523/161; 347/100
See application file for complete search history.

(56) References Cited

U.S. PATENT DOCUMENTS

| 3,785,824 A * | 1/1974 | Fisch .................... 430/466 |
| 4,167,539 A * | 9/1979 | Heilman et al. ............ 525/117 |
| 4,181,185 A | 1/1980 | Keller et al. |
| 4,375,357 A | 3/1983 | Wingard, Jr. et al. |
| 4,466,708 A | 8/1984 | Betensky |
| 4,471,079 A | 9/1984 | Enami |
| 5,030,697 A | 7/1991 | Hugl et al. |
| 5,250,107 A | 10/1993 | Bares |
| 5,534,052 A | 7/1996 | Mennicke et al. |
| 5,672,198 A * | 9/1997 | Belmont .................. 106/31.75 |
| 5,879,439 A | 3/1999 | Nagai et al. |
| 6,083,310 A | 7/2000 | Peterson et al. |
| 6,406,143 B1 * | 6/2002 | Chen et al. ................. 347/105 |
| 2004/0147631 A1 * | 7/2004 | Helling ...................... 523/160 |
| 2006/0030641 A1 | 2/2006 | Tanaka et al. |
| 2006/0089421 A1 | 4/2006 | Vasudevan |
| 2006/0089422 A1 * | 4/2006 | Vasudevan .................. 523/160 |

FOREIGN PATENT DOCUMENTS

| EP | 1 460 113 | 9/2004 |
| EP | 1 489 144 | 12/2004 |
| EP | 1 650 269 | 4/2006 |
| EP | 1 650 273 | 4/2006 |

* cited by examiner

*Primary Examiner*—Vasu Jagannathan
*Assistant Examiner*—Doris L Lee
(74) *Attorney, Agent, or Firm*—Arthur E. Kluegel; Andrew J. Anderson

(57) ABSTRACT

An ink composition suitable for ink jet printing comprises a polymeric colorant in a carrier, the colorant containing at least one hydrophilic portion and at least one hydrophobic portion, wherein the composite log Kow of the polymeric colorant is more positive than −0.7.

18 Claims, No Drawings

POLYMERIC COLORANT-BASED INK COMPOSITIONS

FIELD OF THE INVENTION

This invention relates to polymeric colorants and associated ink compositions suitable for inks and ink jet printing. The polymeric colorants and ink compositions containing them are particularly useful when printed onto a variety of receiving substrates.

BACKGROUND OF THE INVENTION

Ink jet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand ink jet, individual droplets are projected as needed onto the image-recording element to form the desired printed image. Common methods of controlling the ejection of ink droplets in drop-on-demand printing include thermal bubble formation (thermal ink jet (TIJ)) and piezoelectric transducers. In another process known as continuous ink jet (CIJ), a continuous stream of droplets is generated and expelled in an image-wise manner onto the surface of the image-recording element, while non-imaged droplets are deflected, caught and recycled to an ink sump. Ink jet printers have found broad applications across markets ranging from desktop document and photographic-quality imaging, to short run printing and industrial labeling.

Ink compositions used in ink jet printers can be classified as either pigment-based in which the colorant exists as pigment particles suspended in the ink composition, or as dye-based in which the colorant exists as a fully solvated dye species that consists of one or more dye molecules. A sub-class of dye-based inks may contain polymeric colorants in which a chromophore is covalently bound to a polymer structure. Pigment-based inks are often preferred over dye-based inks because they possess better resistance to light and gas, especially ozone, as compared to printed images with dye-based inks.

Pigment-based inks have a number of drawbacks. Great lengths must be undertaken to reduce a pigment to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image. Pigment inks are also difficult to jet through ink jet print heads having small nozzle diameters, for example, less than 25 μm and numerous approaches have been taken to formulate pigment based inks for piezo and thermal ink jet print heads.

Self-dispersed carbon black pigment-based ink compositions lacking a film-forming polymer binder offer high optical density on untreated bond papers that approach electrophotographic-printing quality, with values of about 1.4. The colorant, however, is readily re-dispersed by wet rub abrasion, resulting in undesirably low durability. Polymer-dispersed carbon black pigment ink compositions of the art offer excellent water-fastness, wet rub durability, and dry rub abrasion on all substrates, but optical density suffers on plain papers, where the colorant apparently wicks along the cellulose fibers into the interior of the paper, leading to grayish appearing printed text.

Continuous ink jet printing has related needs for improved ink compositions. High-speed continuous ink jet printing is used in commercial market applications and generally involves printing variable information for transactional documents such as invoices and credit card billing statements, and also scratch-off lottery tickets. Variable-data imprinting subsystems, consisting of a printhead, control electronics, an ink reservoir, an ink pump and an ink delivery system, can be added to an existing high-speed press system for black text printing in labeling or mailing applications. Commonly used dye-based inks can provide adequate optical density on the normal mix of paper substrates, such as plain bond papers, surface-treated papers, or coated and calendared business gloss papers or heavy-stock covers. Dye-based inks, however, suffer poor waterfastness on all substrates, and low durability on glossy papers against wet rub abrasion that can render text and universal packaging code information illegible.

Water-fast polymeric colorants made from polyethyleneimines are known in the art of inks and ink jet printing such as those described in U.S. Pat. Nos. 4,664,708 and 4,375,357. U.S. Pat. No. 5,534,052 discloses aqueous inkjet inks containing polymeric colorants comprised of polyamidoamines bonded with a reactive dye through an amino group. U.S. Pat. No. 4,471,079 discloses aqueous inks containing emulsion particles of a polymeric dyestuff prepared by reacting an anionic dye or a reactive dye with a water-insoluble polymer containing amino groups. U.S. Pat. No. 5,250,107 discloses aqueous inkjet inks containing an ammonium zirconium polymer and a reactive dye which, upon dehydration, crosslink to form a waterfast dye complex. U.S. Pat. Appl. 2004/0147631 discloses aqueous inkjet inks containing a polymeric colorant made from a dye linked into a polymer skeleton. The copolymer colorant consists of a hydrophobic monomer and a hydrophilic nonionic monomer.

U.S. Pat. No. 5,879,439 discloses aqueous inkjet inks containing both a pigment and a polymeric dye where the polymeric dye has an average molecular weight of 5,000 to 15,000 and contains carboxylate groups which are preferred from a standpoint of convenience of production. U.S. Pat. No. 4,181,185 discloses a method of printing polymeric colorants onto a paper stock having therein polyvalent metal cations resulting in water fast images. U.S. Pat. No. 5,030,697 discloses polymeric colorants where the polymer backbone is a copolymer of acrylamide monomers and maleic anhydride. These colorants are further functionalized to enable covalent bonding to biological materials. EP 1 489 144 A1 discloses styrene maleic anhydride based copolymeric dyes that are designed for ink jet inks and have good fabric and skin washability. However, these polymeric dyes are not designed to be water-fast on an ink jet receiver.

Polymeric colorants based on copolymers of styrene and maleic anydride comprising a dye, a pigment and a dispersant functionality covalently attached to the polymer backbone, are disclosed in United States Patent Publication Nos. 2006/0089421 and 2006/0089422.

There remains a need to provide a polymeric colorant that can be utilized in an ink composition that results in high density and good water-fastness when printed onto a wide range of receivers including uncoated or plain paper. In addition, there remains a need to provide a polymeric colorant which can be utilized in an ink composition for ink jet printing which is stable over long periods of time and does not adversely affect the performance of an ink jet nozzle.

SUMMARY OF THE INVENTION

The invention provides an ink composition comprising a polymeric colorant in a carrier, the colorant containing at least one hydrophilic portion and at least one hydrophobic portion, wherein the composite log Kow of the polymeric colorant, is more positive than −0.7. Suitably, the polymeric colorant is represented by general formula I comprising a vinyl maleic anhydride polymer wherein; a portion of the maleic anhydride groups are reacted with one or more dye chromophores, a portion of the maleic anhydride groups are modified to introduce a more general term R3 and the remaining portion of the maleic anhydride groups is hydrolyzed to a carboxylate functionality.

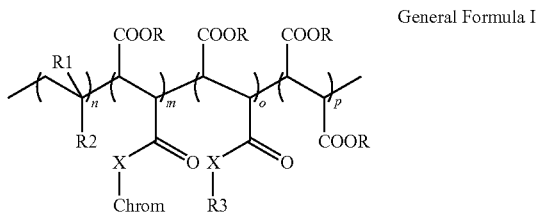

General Formula I wherein:

R is independently hydrogen or a monovalent cation;

R1 and R2 are independently selected from H, alkyl and aryl groups;

each X is independently; O, N, O—R4-O, N—R4-O, O—R4-S, or an N—R4-S group wherein R4 is selected from any alkyl, aryl, or heteroatom-containing aromatic or aliphatic ring groups;

n, m, o and p represent the molar fractions of the distinct molecular units resulting from the reaction of the maleic anhydride units of the copolymer with specified reactants;

where m+o+p=1, m=0.05-0.7, o=0.1-0.8, and p=0-0.5, where n is a number between 1 and 6;

Chrom is a dye chromophore; and

R3 is selected from any branched, linear or cyclic alkyl group having from 2 to 24 carbons, interspersed with from zero to 2 heteroatoms, and any aryl or heteroaryl group having from 6 to 30 carbon atoms, said aryl groups optionally contain heteroatoms.

Also provided is an ink jet printing method comprising the steps of:

providing an ink jet printer that is responsive to digital data signals;

loading the printer with an ink jet recording element comprising an uncoated or coated ink receiving substrate;

loading the printer with an ink jet ink composition as described above; and printing on the image receiving element using the ink jet composition in response to the digital data signals.

Further provided is an ink jet printer containing the above ink formulation and a printed media containing the polymeric colorant.

ADVANTAGEOUS EFFECT OF THE INVENTION

The invention provides numerous advantages. The invention provides a polymeric colorant and related ink composition capable of providing images of high optical density and colorfulness on uncoated receivers; such images are comparable to those achieved with dyes. The invention provides colorants that result in printed images on plain paper substrates that are water-fast and overcome the disadvantages of traditional dye-based inks. At the same time these polymeric colorant-based ink compositions meet all the key requirements for photographic image quality and durability on coated papers designed for photo-printing. The invention also provides an ink composition that is stable to a variety of ink formulations suited to modern-day ink jet printers thus allowing the ink formulator wide latitude in ink design.

The invention provides inks that can be jetted easily in both thermal and piezoelectric drop-on-demand printers and continuous ink jet ink printers. The polymeric colorant based ink compositions help to ensure that print head nozzles do not clog easily, even after hundreds or thousands of pages are printed. Ink compositions of the invention are capable of rendering high density and photographic-quality printed images when printed on a variety of ink jet recording substrates, even those having high gloss, and such printed images exhibit fine durability and long term stability in terms of waterfastness and other environmental factors.

DETAILED DESCRIPTION OF THE INVENTION

The polymeric colorants of the current invention have a general structure represented by formula I and comprise a vinyl maleic anhydride polymer wherein; a portion of the maleic anhydride groups are reacted with one or more dye chromophores (Chrom-XH), a portion of the maleic anhydride groups are reacted with a hydrophobe modulator (R3-XH) and the remaining portion are hydrolyzed to a carboxylate functionality.

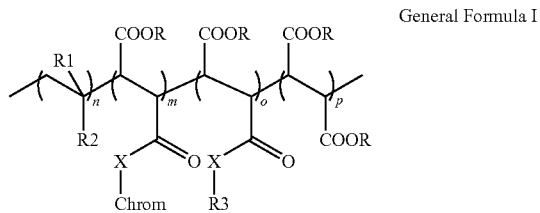

General Formula I wherein:

R is independently hydrogen or a monovalent cation;

R1 and R2 are independently selected from H, alkyl and aryl groups; each X is independently; O, N, O—R4-O, N—R4-O, O—R4-S, or an N—R4-S group wherein R4 is selected from any alkyl, aryl, or heteroatom-containing aromatic or aliphatic ring groups;

n, m, o and p represent the molar fractions of the distinct molecular units resulting from the reaction of the maleic anhydride units of the copolymer with specified reactants;

where m+o+p=1, m=0.05-0.7, o=0.1-0.8, and p=0-0.5, where n is a number between 1 and 6;

Chrom is a dye chromophore; and

R3 is selected from any branched, linear or cyclic alkyl group having from 2 to 24 carbons, interspersed with from zero to 2 heteroatoms, and any aryl or heteroaryl group having from 6 to 30 carbon atoms, said aryl groups optionally contain heteroatoms.

The polymeric colorants of the present invention are not particularly limited in their color. For example, they may be red, blue, green, cyan, magenta, yellow, orange, brown or black. In a preferred embodiment, the polymeric colorant is cyan, magenta, yellow or black. The final color will be determined by the dye chromophore or plurality of dye chromophores attached to the polymeric backbone. It is conceivable that the polymeric colorant may be made of a mixture of different chromophores or from a single type of chromophore.

Classes of useful chromophores include azo dyes, metal-complex dyes, phthalocyanine dyes, anthraquinone dyes, anthrapyridone dyes, rhodamine dyes, methine dyes, azomethine dyes, cyanine dyes, formazan dyes and the like.

Examples of such chromophores are shown below. P denotes site where polymer is attached.

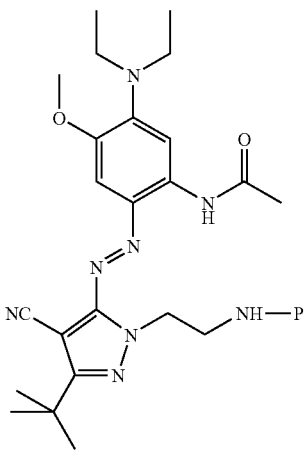

Chromphore 1

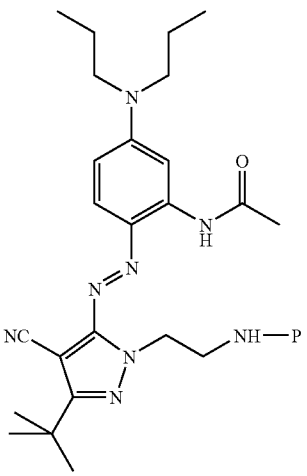

Chromophore 2

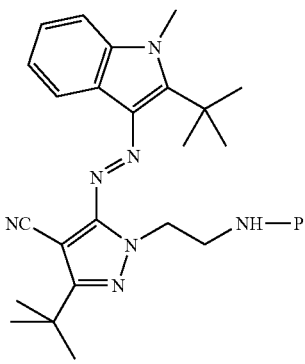

Chromophore 3

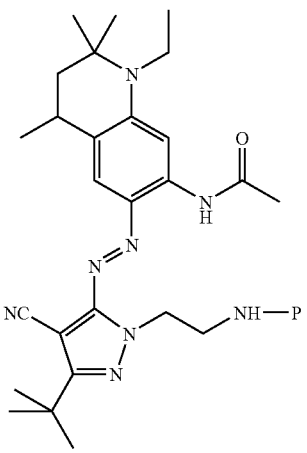

Chromophore 4

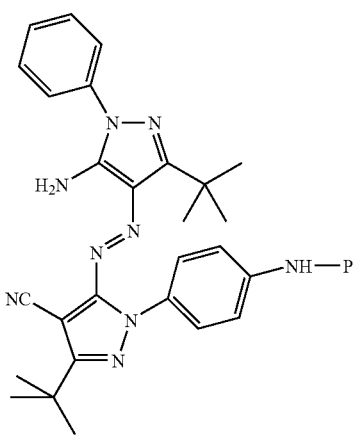

Chromophore 5

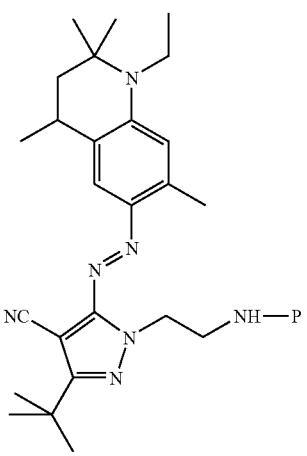

Chromophore 6

-continued
Chromophore 7
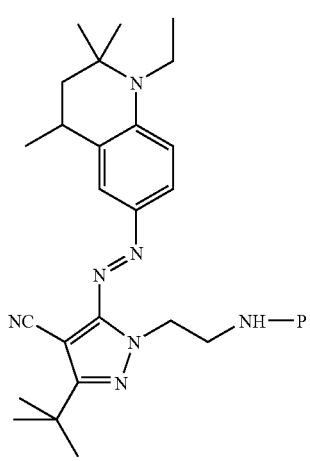
Chromophore 8
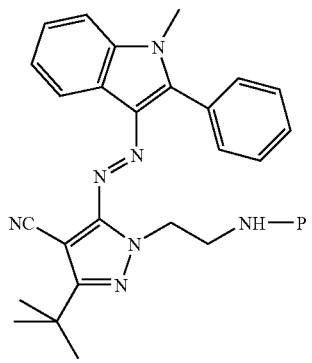
Chromophore 9
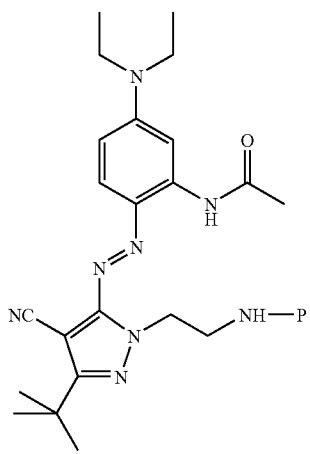
Chromophore 10
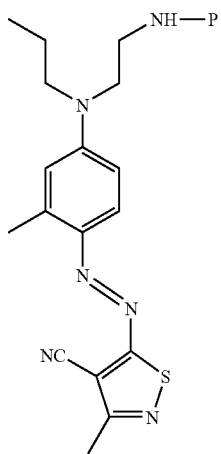
Chromophore 11
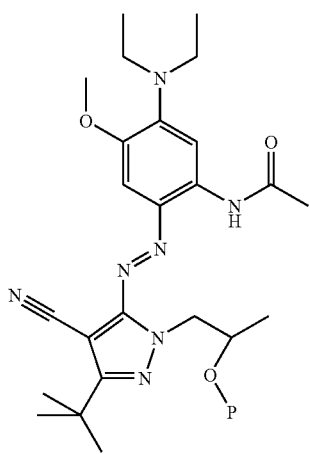
Chromophore 12
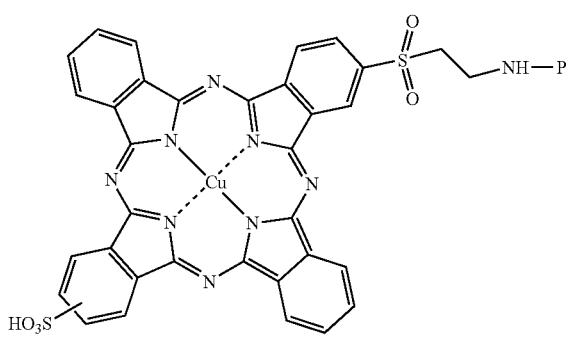

-continued

Chromophore 13

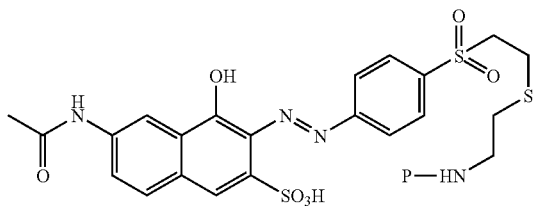

Chromophore 14

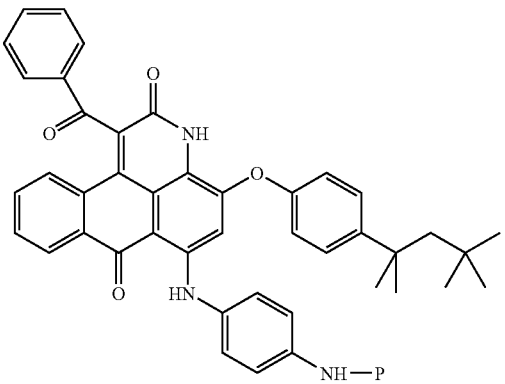

Chromophore 15

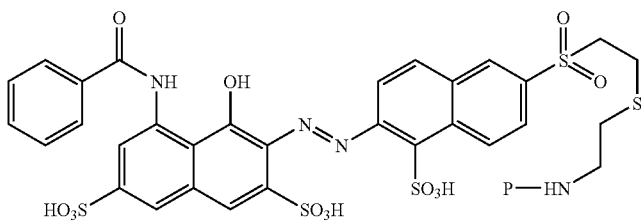

Chromophore 16

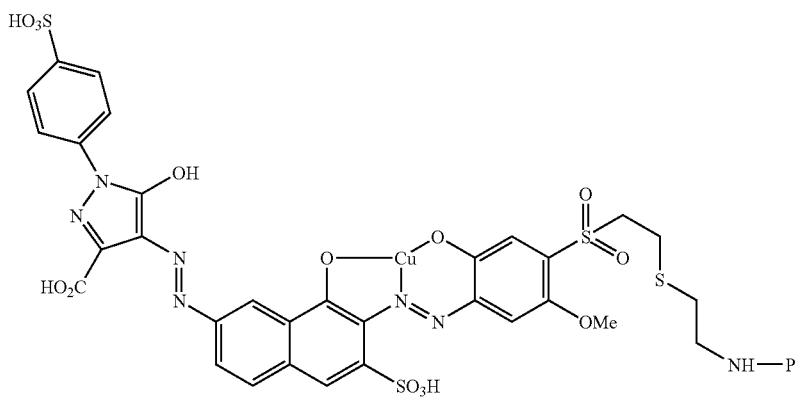

Throughout this application a reference to any type of chemical "group" includes both the unsubstituted and substituted forms of the group described. Generally, unless otherwise specifically stated, substituent groups usable on molecules herein include any groups, whether substituted or unsubstituted, which do not destroy properties necessary for the utility of the polymeric colorant. It will also be understood throughout this application that reference to a compound of a particular general formula includes those compounds of other more specific formula which specific formula falls within the general formula definition.

Examples of substituents on any of the mentioned groups can include known substituents, such as: halogen, for example, chloro, fluoro, bromo, iodo; alkoxy, particularly those with 1 to 6 carbon atoms (for example, methoxy, ethoxy); substituted or unsubstituted alkyl, particularly lower alkyl (for example, methyl, trifluoromethyl); alkenyl or thioalkyl (for example, methylthio or ethylthio), particularly either of those with 1 to 6 carbon atoms; substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); and others known in the art. Alkyl substituents may specifically include "lower alkyl", that is having from 1 to 6 carbon atoms, for example, methyl, ethyl, and the like. Further, with regard to any alkyl group, alkylene group or alkenyl group, it will be understood that these can be branched or unbranched.

Copolymers of maleic anhydride and copolymerizable ethylenically unsaturated hydrophobic monomers are well known, as described, e.g., in U.S. Pat. Nos. 3,488,311, 4,358,573, 4,859,752, 6,020,061 and many others. The anhydride included in the maleic anhydride copolymers is most preferably unsubstituted maleic anhydride. However, other maleic anhydrides can be utilized in the formation of the polymers such as methylmaleic anhydride, dimethylmaleic anhydride, fluoromaleic anhydride, methylethyl maleic anhydride and the like. Accordingly, as employed herein the term "maleic anhydride" includes such substituted anhydrides in whole or in part. It is preferred that the anhydride be substantially free of acid and the like before polymerization.

The copolymerizable ethylenically unsaturated monomer may be, e.g., an alpha-olefin (1-alkene) preferably having 2 to 30 carbon atoms, and more preferably having 2 to 18 carbon atoms, styrene, α-methyl styrene, vinyl toluene, an ethylenically unsaturated ester of an aliphatic acid wherein the acid moiety preferably has 3 to 8 and more preferably 3 to 6 carbon atoms and the ester moiety preferably has 1 to 8 and more preferably 1 to 4 carbon atoms (such as vinyl acetate, allyl acetate, etc.), a monocarboxylic acid ester or dicarboxylic acid ester of an ethylenically unsaturated monomer wherein the acid moiety preferably has 3 to 8 and more preferably 3 to 6 carbon atoms and the ester moiety preferably has 1 to 8 and more preferably 1 to 4 carbon atoms (such as methyl methacrylate, ethyl acrylate, n-butyl acrylate, n-butyl methacrylate, n-octyl acrylate, benzyl acrylate, etc.), acrylonitrile, acrylic acid, methacrylic acid, acrylamide. Of these monomers, styrenes and alkenes are particularly preferred. Two or more of such copolymerizable ethylenically unsaturated monomers as described above can be used together with the maleic anhydride monomers.

Alpha olefin maleic anhydride copolymers useful in preferred embodiments of the present invention are copolymers of maleic anhydride and at least one 1-alkene. These polymers are partially disclosed in U.S. Pat. No. 4,358,573 (bulk processing) and U.S. Pat. No. 4,522,992 (solution processing) which patents are expressly incorporated by reference for their disclosure of suitable alpha olefin maleic anhydride polymers as well as in U.S. Pat. No. 4,871,823 likewise incorporated herein by reference. The alpha olefins generally suitable in the formation of the polymers for use as surfactants as described herein generally have from 2 to 30 carbon atoms, preferably between about 2 and 18 carbon atoms, and include the following: ethylene; propylene; 1-butene; 1-pentene; 1-hexene; 1-heptene; 1-octene; 1-nonene; 1-decene; 1-dodecene; 1-tetradecene; 1-hexadecene; 1-heptadecene; 1-octadecene; 2-methyl-1-butene; 3,3-dimethyl-1-pentene; 2-methyl-1-heptene; 4,4-dimethyl-1-heptene; 3,3-dimethyl-1-hexene; 4-methyl-1-pentene; isobutylene; di-isobutylene; and mixtures thereof. These materials should be substantially free of difunctional monomers which may result in substantial crosslinking and gel formation. Small amounts, however (e.g., less than 2 percent), of most diolefins can be present without causing undue gel formation and cross-linking in the resulting polymers, and substantial higher amounts of some diolefins (e.g., butadiene) may be incorporated without gel formation.

For the purposes of this invention, the maleic anhydride based copolymer used to prepare the polymeric colorant should preferably contain from 40 to 60 mole percent of units derived from maleic anhydride monomers. As is well known in the art, polymers containing equimolar ratios of alpha olefin (or other vinyl monomer) to maleic anhydride are typically alternating polymers with maleic anhydride units alternating between random comonomer units. The optimum alpha olefin maleic anhydride polymers accordingly include about 50 mole % maleic anhydride and about 50 mole % alpha olefin, but this is dependent upon the alpha olefin selected. Under some conditions such as is described in U.S. Pat. No. 4,871,823 noted above, it is possible to include a significant excess of maleic anhydride relative to the comonomer in these polymers. Accordingly, the alpha olefin maleic anhydride polymers may contain greater than 60 mole percent of maleic anhydride. These polymers can be linear or branched.

The base hydrolyzed maleic anhydride based copolymer employed in the present invention are polymeric compounds having a weight average molecular weight of at least 1000. Preferably, the molecular weight of the copolymer is less than 100,000, and more preferably less than 70,000.

Maleic anhydride copolymers useful in the invention are commercially available and may be prepared using conventional polymerization techniques. Alpha olefin maleic anhydride copolymers, e.g., may be prepared by any of a number of conventional polymerization processes including those as set forth in U.S. Reissue Pat. No. Re. 28,475 and U.S. Pat. Nos. 3,553,117, 3,560,455, 3,560, 456, 3,560,457, 3,488, 311, 4,522, 992, 4,358,573, 4,871,823, 4,859,752, and 5, 336,727. These patents are all incorporated herein by reference. The maleic anhydride and aliphatic olefin copolymers can be prepared, e.g., in neat alkenes at 160° C.; in solvents such as the aromatic hydrocarbons which dissolve the monomers but precipitate the polymers (precipitation polymerization or suspension polymerization); or in solvents such as the ketones which dissolve both the reactants and the polymers (solution polymerization). The temperature range for solution polymerization is typically around 60-80° C. The radical initiators are usually AIBN or benzoyl peroxide.

R3 is a group that is used to modify the overall hydrophobicity of the polymeric colorant. As such, the exact choice of R3 will depend on the ratios of m, n, o and p and the monomers that make up each of m, n, o and p. R3 may be selected from any, substituted or unsubstituted, branched, linear or cyclic alkyl group having from about 2 to 24 carbons, more preferably from about 6 to 24 carbons and most preferably from about 8 to 24 carbons. The alkyl groups of R3 may also be interspersed with a limited number of heteroatoms such as O, N and S, preferably from about zero to six heteroatoms, and more preferably zero to two heteroatoms. R3 may also be a substituted or unsubstituted aryl group having from about 6 to 30 carbon atoms. The aryl groups may also contain heteroatoms and may themselves be molecules that can impart light stability or antioxidant properties to the polymeric colorant. The most preferred groups for R3 are selected from alkyl chains having from 8 to 24 carbons provided that X in Formula I is oxygen or nitrogen.

The useful molecular weight of the described polymeric colorants is higher than 2,000, preferably between 3,000 and 150,000, more preferably between 3,000 and 100,000.

The polymeric colorants useful in aqueous-based inks of the invention can be classified as water-soluble polymers, water-reducible polymers or water-dispersible polymeric particles.

By the term "water-soluble" is meant that the polymeric colorant is dissolved in water such that scattering is not observed when a dilute solution of the polymeric colorant is analyzed using dynamic light scattering or any other technique well known in the art of particle analysis. The water-soluble polymers useful in the ink compositions are differentiated from polymer particles in that they are soluble in the water phase or combined water/water-soluble humectant phase of the ink.

By the term "water-reducible" is meant that the polymeric colorant can be diluted with water to form reasonably stable dispersions of polymer aggregates swollen by solvent and water, as described in "Organic Coatings: Science and Technology" (2nd Edition by Wicks, Jones and Papas, published by Wiley-Interscience, 1999).

By the term "water-dispersible" is meant that the polymeric colorant exists in the form of discrete particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

In a preferred embodiment of the present invention the polymeric colorant is formulated into an aqueous-based ink composition. Prior to, or during the ink manufacturing operation, the acid form of the polymeric colorant (R=H in general formula I) is reacted with a base to deprotonate acidic functional groups on the hydrophilic polymer segments. In one embodiment the copolymer is reacted with an organic base. Typical organic bases include dimethylethanolamine, ammonia, triethanolamine, and tetramethylethlenediamine. Inorganic bases such as potassium hydroxide, lithium hydroxide, or sodium hydroxide may also be used. The degree of neutralization may be varied to an extent sufficient to render the polymeric colorant completely soluble in the aqueous phase of the ink.

The polymeric colorants used in the ink composition of the invention may be present in any effective amount, generally from 0.1 to 20% by weight, and preferably from 0.5 to 10% by weight.

It is also possible that inks of the present invention may contain a combination of the inventive polymeric colorant and a pigment. Pigments suitable for use in the invention include, but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

The inks of the invention could also optionally comprise, in addition to the polymeric colorant, self-dispersing pigments that are dispersible without the use of a dispersant or surfactant may also be useful in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups. Examples of self-dispersing type pigments include, but are not limited to, Cab-O-Jet® 200 and Cab-O-Jet® 300 (Cabot Corp.) and Bonjet® Black CW-1, CW-2, and CW-3 (Orient Chemical Industries, Ltd.).

The inks of the invention could also optionally comprise, in addition to the polymeric colorant, dyes known in the art of ink jet printing. For aqueous-based ink compositions dyes suitable for use in the invention include, but are not limited to, water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like.

It is also contemplated that the ink compositions of the present invention may also contain non-colored particles such as inorganic particles or polymeric particles. The use of such particulate addenda has increased over the past several years, especially in ink jet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 B2 describes the use of a water-dispersible polymeric latex in dye-based inks in order to improve light and ozone resistance of the printed images. The ink composition may contain non-colored particles such as inorganic or polymeric particles in order to improve gloss differential, light and/or ozone resistance, waterfastness, rub resistance and various other properties of a printed image; see for example, U.S. Pat. No. 6,598,967 B1 or U.S. Pat. No. 6,508,548 B2.

Examples of inorganic particles useful in the invention include, but are not limited to, alumina, boehmite, clay, calcium carbonate, titanium dioxide, calcined clay, aluminosilicates, silica, or barium sulfate. Examples of polymeric particles useful in the invention include; water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric particles are styrene-acrylic copolymers sold under the trade names Joncryl® (S.C. Johnson Co.), Ucar™ (Dow Chemical Co.), Jonrez® (Mead-Westvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.). These polymeric particles are preferred because they are compatible in typical aqueous-based ink compositions, and because they render printed images that are highly durable towards physical abrasion, light and ozone.

The non-colored particles used in the ink composition of the invention may be present in any effective amount, generally from 0.01 to 20% by weight, and preferably from 0.01 to 6% by weight. The exact choice of non-colored particles will depend upon the specific application and performance requirements of the printed image.

Ink compositions may also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Representative examples of water soluble polymers include, polyvinyl alcohols, polyvinyl acetates, polyvinyl pyrrolidones, carboxymethyl cellulose, polyethyloxazolines, polyethyleneimines, polyamides and alkali soluble resins, polyurethanes (such as those found in U.S. Pat. No. 6,268,101), polyacrylic acids, styrene-acrylic methacrylic acid copolymers (such as Joncryl® 70 from S.C. Johnson Co., TruDot® IJ-4655 from MeadWestvaco Corp., and Vancryl® 68S from Air Products and Chemicals, Inc.

Ink compositions useful in the invention may include humectants and/or co-solvents in order to prevent the ink composition from drying out or crusting in the nozzles of the printhead, to aid solubility of the components in the ink composition, or to facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, di(ethylene glycol), tri(ethylene glycol), tetra(ethylene glycol), propylene glycol, poly(ethylene glycol), poly(propylene glycol), 1,2-propanediol, 1,3-propanediol, 1,2-butanediol, 1,3-butanediol, 1,4-butanediol, 1,2-pentanediol, 1,5-pentanediol, 1,2-hexanediol, 1,6-hexanediol, 2-methyl-2,4-pentanediol, 1,2-heptanediol, 1,7-hexanediol, 2-ethyl-1,3-hexanediol, 1,2-octanediol, 2,2,4-trimethyl-1,3-pentanediol, 1,8-octanediol, glycerol, 1,2,6-hexanetriol, 2-ethyl-2-hydroxymethyl-propanediol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, di(ethylene glycol) monomethyl ether, and di(ethylene glycol) monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone.

Typical aqueous-based ink compositions useful in the invention directed at drop-on-demand ink jet printing may contain, for example, the following components based on the total weight of the ink: water 20-95%, humectant(s) 0-70%, and co-solvent(s) 0-20%.

Surfactants may be added to the ink composition to adjust the surface tension of the ink to an appropriate level provided that they do not compromise the colloidal stability of the pigment particles. The surfactants may be anionic, cationic, amphoteric or nonionic and used at levels of about 0.01 to 5% of the ink composition. Examples of suitable nonionic surfactants include, linear or secondary alcohol ethoxylates (such as the Tergitol® 15-S and Tergitol® TMN series available from Union Carbide Corp. and the Brij® series from Uniquema®, Imperial Chemical Industries PLC), ethoxylated alkyl phenols (such as the Triton® series from Union Carbide Corp.), fluoro surfactants (such as the Zonyls® from DuPont; and the Fluorads® from 3M Co.), fatty acid ethoxylates, fatty amide ethoxylates, ethoxylated and propoxylated block copolymers (such as the Pluronic® and Tetronic® series from BASF, ethoxylated and propoxylated polysiloxane based surfactants (such as the Silwet® series from GE Silicones, General Electric Co.), and acetylenic polyethylene oxide surfactants (such as the Surfynols® from Air Products and Chemicals, Inc.).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphate esters of alkyl and aryl alcohols, including the Strodex® series from Dexter Chemical LLC.), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in *McCutcheon's Emulsifiers and Detergents North American Edition International Edition* 1996 *Annuals*, Vol. 1, McCutcheon Division of Manufacturing Confectionar Co., Glen Rock, N.J. (1996).

A biocide may be added to an ink jet ink composition to suppress the growth of microorganisms such as bacteria, molds, fungi, etc. in aqueous inks. Useful preservatives are exemplified by alkylisothiazolones, chloroalkylisothiazolones, and benzisothiazolones. Preferred commercial products for use in an ink composition include Proxel® GXL (Arch Chemicals, Inc.) and Kordek® MLX (Rohm and Haas Co.) at a final concentration of 0.0001-0.5 wt. %. Additional additives which may optionally be present in an ink jet ink composition include thickeners, conductivity enhancing agents, anti-kogation agents, drying agents, waterfastness agents, dye solubilizers, chelating agents, binders, light stabilizers, viscosifiers or thickeners, buffering agents, anti-mold agents, anti-cockle agents, anti-curl agents, stabilizers, antifoamants and defoamers.

The pH of the aqueous ink compositions of the invention may be adjusted by the addition of organic or inorganic acids or bases. Useful inks may have a preferred pH of from about 2 to 11, depending upon the type of dye or pigment being used. Typical inorganic acids include hydrochloric, phosphoric and sulfuric acids. Typical organic acids include methanesulfonic, acetic, oxalic and lactic acids. Typical inorganic bases include alkali metal hydroxides and carbonates. Typical organic bases include ammonia, dimethylethanolamine, triethanolamine, and tetramethylethlenediamine.

The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities for drop-on-demand printing are no greater than 20 cP, and preferably in the range of about 1.0 to 6.0 cP. Acceptable surface tensions for drop-on-demand printing are no greater than 60 dynes/cm, preferably in the range of 20 dynes/cm to 50 dynes/cm, and most preferably in the range of 28 dynes/cm to 45 dynes/cm.

In contrast to sheet-fed drop-on-demand printing, CIJ is a very high speed printing process, and it is desired to operate paper roll-fed web transport presses at substrate transport speeds in excess of 300 m/s. Printing speed alone imposes some limitations on ink formulation relative to slower drop-on-demand printing techniques, simply on the basis of the short time requirements for adequately drying the printed substrate moving at full speed in the press before roll wind-up. Surprisingly, features of CIJ printhead operation can allow wider ink formulation latitude than is possible in DOD printing in other respects, however. Ink formulation considerations specific to traditional CIJ printing are described in W. Wnek, *IEEE Trans*. 1986, 1475-81, which elucidates the ink performance requirements for drop formation, deflection and catching of non-printing drops, recirculation of the ink to the printhead from the storage reservoir for future printing, and also for commercial ink-media image quality and durability.

An ink jet ink composition for use in a continuous ink jet printer desirably contains water as the principal vehicle or carrier medium, colorant, humectant, biocide, and surfactant; it can desirably further contain one or more types of other components, including and not limited to a film-forming binder or mordant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal agent, a jetting aid, a filament length modifier, a trace of multivalent cationic flocculating salt, a solution conductivity control agent, or a compound for suppressing electrostatic deflection charge shorts when ink dries on the charge ribbon electrodes.

The total humectant level of the ink jet ink composition for CIJ printing is desirably from 0 to about 10% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in U.S. 2005/0075415 A1 to Harz et al. More desirably, the total humectant level is from about 1% to about 5%, in order to facilitate drying of the ink jet printing recording material in a high speed printer while simultaneously encouraging higher equilibrium moisture content in dried ink film on hardware for redispersion and clean-up by ink, or by start-up and shut-down fluids, or by a printhead storage fluid. As use herein in reference to ink jet ink compositions for use in a continuous ink jet printer, a humectant may be comprised of an alcohol, such as 2-propanol or 1-pentanol; a polyol, such as glycerol or ethylene glycol; a glycol ether, such as di(ethylene glycol), tri(ethylene glycol), poly (ethylene glycol)-400 (average $M_n$ ca. 400, herein referred to as PEG-400 for convenience), or poly(propylene glycol)-425 (average $M_n$ ca. 425); an aromatic glycol ether such as propylene glycol phenyl ether (e.g., Dowanol® PPh glycol ether) or an aliphatic glycol ether such as diethylene glycol mono-n-butyl ether or poly(ethylene glycol) methyl ether (average $M_n$ ca. 550); a lactam, such as 2-pyrrolidinone, N-methyl-2-pyrrolidinone, or polyvinylpyrrolidone; an 110 alternative polar solvent such as dimethyl sulfoxide, N,N-dimethylformamide, acetamide, N-methylacetamide, N,N-diethylacetamide or morpholine; a polyvalent aliphatic organic alcohol such as 1,5-pentanediol, 1,2-hexanediol, 1,6-hexanediol, or 2-ethyl-2-hydroxymethyl-1,3-propanediol, or a saccharide such as sorbitol or fructose; or an urea. It is recognized that the effectiveness of the humectant in accomplishing water retention and wetting will depend on its chemical structure. When the humectant chemical structure produces lower water retention, higher levels of the humectant can be used without adversely affecting the drying rate of the printed ink.

The pH of the ink jet ink composition directed at CIJ is desirably adjusted from about 7 to about 12; more desirably, the pH is about 8 to 10. When the ink composition is used in hardware with nickel or nickel-plated apparatus components, an anticorrosion inhibitor such as the sodium salt of 4- or 5-methyl-1-H-benzotriazole is desirably added and the pH adjusted to be from about 10 to about 11. When the ink composition is used with printheads with components fabricated from silicon that are in contact with the fluid, the ink composition pH is desirably adjusted to be from about 7 to about 9.5; more desirably, the pH ranges from about 8 to about 9. In order to minimize the risk of excessively protonating carboxylate anions associated with polymeric dispersant that might render the ink composition more susceptible to pigment flocculation, pH levels lower than about 7 are desirably avoided. With hardware components fabricated from silicon in contact with the ink composition, pH levels higher than about 10 can induce significant rates of etch and corrosion that may impair the operation of the device over time. Amine bases especially desirable in the application of the invention to CIJ printing include 3-amino-1-propanol, N,N-dimethanolamine, N,N-dimethylethanolamine, N,N-diethylethanolamine, and triethanolamine.

Defoaming agents comprised of phosphate esters, polysiloxanes, or acetylenic diols are optionally used with the ink compositions directed at CIJ to minimize foam formation caused the fluid agitation associated with drop catching and ink recirculation.

In one embodiment of the invention, the ink jet ink composition for use in a continuous ink jet printer is printed by a method employing a plurality of drop volumes formed from a continuous fluid stream and non-printing drops of a different volume than printing drops are diverted by a drop deflection means into a gutter for recirculation, as disclosed in U.S. Pat. No. 6,588,888 B2 to Jeanmaire et al., U.S. Pat. No. 6,554,410 B2 to Jeanmaire et al., U.S. Pat. No. 6,682,182 B1 to Jeanmaire et al., U.S. 2003/0202054 A1 to Jeanmaire et al., U.S. Pat. No. 6,793,328 B2 to D. Jeanmaire, U.S. Pat. No. 6,866,370 B2 to D. Jeanmaire, U.S. Pat. No. 6,575,566 B1 to Jeanmaire et al., and U.S. Pat. No. 6,517,197 B2 to Hawkins et al., the disclosures of which are herein incorporated in their entirety by reference. In another preferred embodiment, the ink jet ink composition is printed using an apparatus capable of controlling the direction of the formed printing and non-printing drops by asymmetric application of heat to the fluid stream that initializes drop break-up and serves to steer the resultant drop, as disclosed in U.S. Pat. No. 6,079,821 B2 to Chwalek et al, and in U.S. Pat. No. 6,505,921 B2 to Chwalek et al., the disclosures of which are herein incorporated in their entirety by reference. Useful ink agitation, heated ink supply and printhead and fluid filtration means for CIJ pigmented ink jet ink compositions are described in U.S. Pat. No. 6,817,705 B1 to Crockett et al. Printer replenishing systems for maintaining ink quality and countering the effects of ink volatile component evaporation are described in U.S. Pat. No. 5,526,026 to M. Bowers, U.S. Pat. No. 5,473,350 to Mader et al., and EP 0 597 628 A1 to Loyd et al. Inks comprising the polymeric colorants of the present invention are applied in a controlled fashion to an image recording element. In a preferred embodiment the inks are applied by ejecting ink droplets from a plurality of nozzles, or orifices, in a print head of an ink jet printer. The polymeric colorants of the present invention can be applied to a wide variety of image recording elements.

Inks comprising the polymeric colorants of the present invention may be applied to photoglossy or plain paper image recording elements. The two types of image recording elements are distinguished from one another in that the photo-glossy element is manufactured with a coated layer above the underlying paper support. Typically, such photo-glossy elements may be further categorized as having a swellable polymer coating (non-porous media) or a microporous media, although hybrid designs are also well known. Typical polymer coated media are capable of very high gloss in excess of 60 gloss units at a viewing angle of 60 degrees. Typical microporous media can be designed to have gloss values approaching those of some polymer coated media. The design of the both plain paper and photo-glossy media vary widely depending on materials and paper manufacturing processes which should not be construed to limit the scope of the present invention.

Representative examples of the polymeric colorants useful in the present invention are illustrated in table 1. These examples are intended to illustrate, not to limit, the invention.

EXAMPLES

Modifications to prepare polymers of General Formula I:
R1=phenyl, R2=H Styrene-maleic anhydride copolymer
   i. Mw=5,000(SMA)
R1=R2=Methyl Isobutylene-maleic anhydride copolymer
   ii. Mw=6,700 (IBMA, 6 k)
   iii. Mw=60,000 (IBMA, 60 k)
R3: lauryl ($C_{12}H_{25}$), oleyl ($C_{18}H_{35}$), ethylhexyl ($C_{18}H$ 17)
   where X is nitrogen
Chrom: Chromophores 10 and 1

TABLE 1

Examples of Useful Polymeric Colorants

| Polymeric Colorant | Chrom | R3 | Polymer backbone | n | m | o | p | Composite logKow |
|---|---|---|---|---|---|---|---|---|
| 1 | 10 | C12H25 | SMA | 1 | 0.6 | 0.4 | 0 | 4.172 |
| 2 | 10 | C18H35 | SMA | 1 | 0.6 | 0.4 | 0 | 5.264 |
| 3 | 10 | C12H25 | SMA | 1 | 0.375 | 0.375 | 0.25 | 2.570 |
| 4 | 10 | C12H25 | SMA | 1 | 0.375 | 0.5 | 0.125 | 3.403 |
| 5 | 10 | C12H25 | SMA | 1 | 0.5 | 0.375 | 0.125 | 3.368 |
| 6 | 10 | C18H35 | SMA | 1 | 0.375 | 0.375 | 0.25 | 3.594 |
| 7 | 10 | C18H35 | SMA | 1 | 0.375 | 0.5 | 0.125 | 4.768 |
| 8 | 10 | C18H35 | SMA | 1 | 0.5 | 0.375 | 0.125 | 4.391 |
| 9 | 10 | C12H25 | SMA | 1 | 0.6 | 0.25 | 0.15 | 3.173 |
| 10 | 10 | C12H25 | SMA | 1 | 0.25 | 0.6 | 0.15 | 3.271 |
| 11 | 10 | C12H25 | IBMA, 6k | 1 | 0.5 | 0.5 | 0 | 3.540 |
| 12 | 10 | C18H35 | IBMA, 6k | 1 | 0.5 | 0.5 | 0 | 4.905 |
| 13 | 10 | C12H25 | IBMA, 6k | 1 | 0.4 | 0.4 | 0.2 | 2.236 |
| 14 | 10 | C12H25 | IBMA, 6k | 1 | 0.3 | 0.6 | 0.1 | 2.930 |
| 15 | 10 | C12H25 | IBMA, 6k | 1 | 0.6 | 0.3 | 0.1 | 2.846 |
| 16 | 10 | C18H35 | IBMA, 6k | 1 | 0.4 | 0.4 | 0.2 | 3.328 |
| 17 | 10 | C18H35 | IBMA, 6k | 1 | 0.3 | 0.6 | 0.1 | 4.568 |
| 18 | 10 | C18H35 | IBMA, 6k | 1 | 0.6 | 0.3 | 0.1 | 3.665 |
| 19 | 10 | C12H25 | SMA | 1 | 0.3 | 0.7 | 0 | 4.256 |
| 20 | 10 | C12H25 | IBMA, 6k | 1 | 0.55 | 0.35 | 0.1 | 2.860 |
| 21 | 10 | C12H25 | IBMA, 6k | 1 | 0.5 | 0.4 | 0.1 | 2.874 |
| 22 | 10 | C8H17 | SMA | 1 | 0.25 | 0.6 | 0.15 | 2.089 |
| 23 | 10 | C12H25 | IBMA, 60k | 1 | 0.3 | 0.6 | 0.1 | 2.930 |
| 24 | 10 | C12H25 | IBMA, 60k | 1 | 0.5 | 0.4 | 0.1 | 2.874 |
| 25 | 10 | C12H25 | IBMA, 60k | 1 | 0.55 | 0.35 | 0.1 | 2.860 |
| 26 | 1 | C12H25 | SMA | 1 | 0.25 | 0.55 | 0.2 | 2.941 |
| 27 | 1 | C12H25 | SMA | 1 | 0.15 | 0.45 | 0.4 | 1.636 |
| 28 | 1 | C12H25 | SMA | 1 | 0.15 | 0.36 | 0.49 | 1.036 |

Synthesis of Polymeric Colorant 10

The vinyl-maleic anhydride copolymer Sartomer SMA1000P (100 g) and 41 g of chromophore 10 (where NH—P is NH$_2$) are dissolved together in 1 L of THF, and then 50 mL of triethylamine are added. The reaction mixture is stirred at 25° C. for 3 hours until all colorant reacted with the polymer. Then 55.5 g of dodecylamine are added together with 91 mL of triethylamine and the mixture is stirred 6 hours at 25° C. The resulting mixture is evaporated to dryness in a Rotavapor and 1 L of water is added. The aqueous mixture is stirred at room temperature 2-4 hours to allow the complete hydrolysis of any residual anhydride groups. The resulting homogeneous solution is then poured over a 10% HCl solution when the colored polymer precipitates in the carboxylic acid form. After filtration and washing to neutral pH of the filtrate, the precipitate is dried at 50° C. in a vacuum oven for 6-12 hours.

The structure of polymeric colorant 10 is as follows:

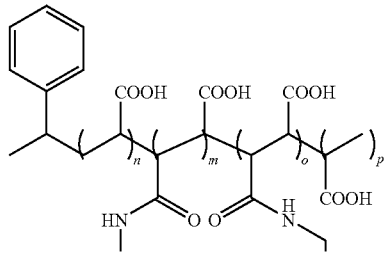

Polymeric Colorant 10 n = 1, m = 0.25, o = 0.6, p = 0.15

A synthetic procedure similar to that used for polymeric colorant 10 was used to prepare polymeric colorant 26, comparative polymeric colorant 1 and comparative polymeric colorant 2.

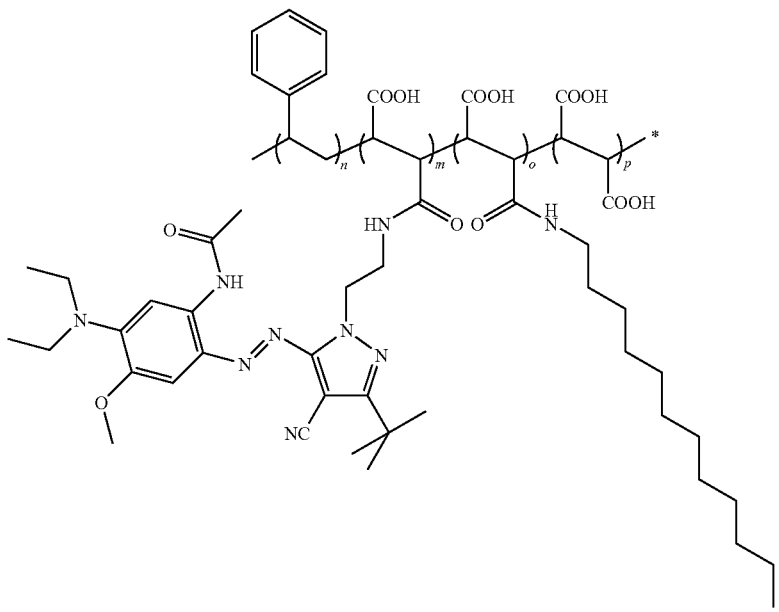

Polymeric Colorant 26
n = 1, m = 0.25, o = 0.55, p = 0.2

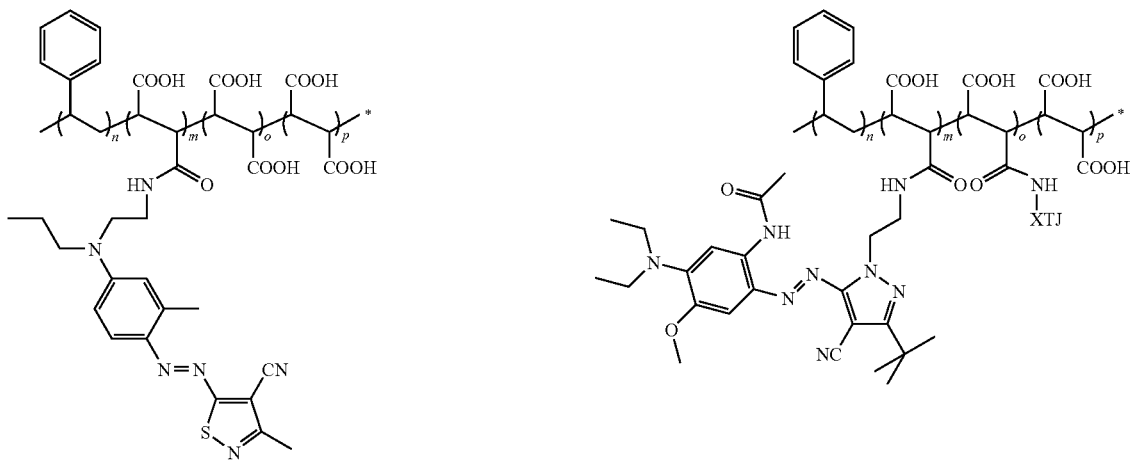

Comparative Polymeric Colorant 1
n = 1, m = 0.25, o = 0.6, p = 0.15

Comparative Polymeric Colorant 2
n = 1, m = 0.25, o = 0.55, p = 0.2
where XTJ label denotes polyether
fragment of Jefffamine XTJ-506

The inventors have determined that certain polymeric colorants can provide high density and excellent water-fastness on plain paper substrates. The polymeric colorants useful in the present invention can be defined by a composite log Kow parameter where, the composite log Kow parameter is defined as the molar-averaged calculated octanol-water partition coefficient of the molecular units derived from the polymeric colorant. A representation of the molecular units obtained from breaking down General Formula 1, for the purpose of calculating the composite logKow of the polymeric colorant, is shown in Formula II.

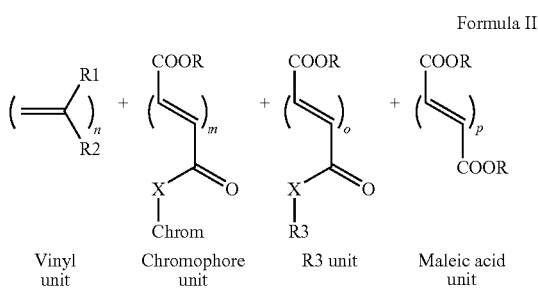

Formula II

Vinyl unit | Chromophore unit | R3 unit | Maleic acid unit

The composite log Kow parameter for the polymer is defined by equation (1):

$$\text{composite log } Kow_{polymer} = \Sigma(x_i \log Kow_{unit-i}) \quad (1)$$

where, $x_i$ is defined as the molar fraction of molecular unit i, of the polymer and log $Kow_{monomer-i}$ is defined as the calculated log Kow of molecular unit, i. For the purposes of calculating the composite log $Kow_{unit-i}$, any molecular unit containing ionic species such as, carboxylate, sulfonate, etc., are represented by their sodium salt in order to represent the monomer at basic conditions at about a pH of 7 or above. The log $Kow_{polymer}$ is calculated by considering all of the molecular units, including hydrophobic, hydrophilic and dye chromophore monomers multiplied by their respective molar fraction in the total polymer composition.

The parameter may be a negative or positive number with more negative numbers indicating a greater propensity to partition into water. The specific calculation of the log Kow for each molecular unit may be accomplished with the KOWWIN® Octanol-Water Partition Coefficient Software from Syracuse Research Corporation. Although any version of the software may be used, the present calculations are accomplished using Version 1.61. An example of the calculation of composite log $Kow_{polymer}$ for Comparative Polymeric Colorants 1 and 2, and Inventive Polymeric Colorant 10 are illustrated as follows:

TABLE 2

Calculation of composite log Kow of Inventive Polymeric Colorant 10

| Inventive Polymeric Colorant 10 | Vinyl (styrene) unit | Chromophore (10) unit | R3 (C12 amide) unit | Maleic acid unit |
|---|---|---|---|---|
| log $Kow_{unit-i}$ | 2.89 | 1.17 | 1.45 | −5.21 |
|  | n | m | o | p |
| molar fraction $x_i$ | 1 | 0.25 | 0.6 | 0.15 |
| log Kow * $x_i$ | 2.89 | 0.2925 | 0.87 | −0.7815 |
| Composite log Kow polymeric colorant $\Sigma(\log Kow * x_i)$ | 3.271 | | | |

TABLE 3

Calculation of composite log Kow of Comparative Polymeric Colorant 1

| Comparative Polymeric Colorant 1 | Vinyl (styrene) unit | Chromophore (10) unit | R3 (C12 amide) unit | Maleic acid unit |
|---|---|---|---|---|
| log $Kow_{unit-i}$ | 2.89 | 1.17 | 4.18 | −5.21 |
|  | n | m | o | p |
| molar fraction $x_i$ | 1 | 0.25 | 0 | 0.72 |
| log Kow * $x_i$ | 2.89 | 0.2925 | 0 | −3.9075 |
| Composite log Kow polymeric colorant $\Sigma(\log Kow * x_i)$ | −0.725 | | | |

TABLE 4

Calculation of composite log Kow of Comparative Polymeric Colorant 2

| Comparative Polymeric Colorant 2 | Vinyl (styrene) unit | Chromophore (1) unit | R3 (Jeffamine XTJ-506) unit | Maleic acid unit |
|---|---|---|---|---|
| log $Kow_{unit-i}$ | 2.89 | 1.18 | −8.74 | −5.21 |
|  | n | m | o | p |
| molar fraction $x_i$ | 1 | 0.25 | 0.6 | 0.15 |
| log Kow * $x_i$ | 2.89 | 0.295 | −5.244 | −0.7815 |
| Composite log Kow polymeric colorant $\Sigma(\log Kow * x_i)$ | −2.840 | | | |

Composite log Kow parameters for respective polymers in the present invention are also provided in Table 1. For the purposes of this invention, the polymeric colorants have a composite log $K_{ow}$ of greater than about −0.7, preferably greater than about 0.0, more preferably greater than about 1.0 and even more preferably greater than 1.5. Polymeric colorants satisfying the parameters of composite log $K_{ow}$ exhibit excellent water-fastness and color density when printed on plain papers.

Inkjet Ink Formulation for Evaluation of Polymeric Colorants

The following is the inkjet ink formulation used for desktop printing evaluations:

5-10% polymeric colorant, neutralized with required amount of KOH IN, 2.5% glycerol, 2% 2-pyrrolidinone, 5.5% ethylene glycol and the balance water to 100%. The prepared inks were filtered through a 0.45 μm PTFE filter cartridge and printed with a Canon S520 printer.

Plain Paper Density

Polymeric colorants 10, 11, 12, and 19 and comparative polymeric colorants 1 and 2 were formulated using the inkjet ink formula from above at different concentrations (see Table 5) and were printed on 12 different plain paper receivers as patches at 100% dot coverage. The densities were measured as Status A densities on the magenta channel using an X-Rite densitometer.

TABLE 5

Polymeric Colorant Inks

| Experiment | Polymeric colorant | Conc. of polymeric colorant in ink |
|---|---|---|
| Ink 1 | Polymeric colorant 10 | 5% |
| Ink 2 | Polymeric colorant 10 | 10% |
| Ink 3 | Polymeric colorant 11 | 5% |
| Ink 4 | Polymeric colorant 12 | 5% |
| Ink 5 | Polymeric colorant 19 | 5% |
| Ink 6 | Polymeric colorant 19 | 7.50% |
| Ink 7 | Polymeric colorant 19 | 10% |

TABLE 6

Status A Optical Densities of Inks Printed onto Plain Paper Receivers at 100% dot coverage

| Receiver/Ink | Ink 1 | Ink 2 | Ink 3 | Ink 4 | Ink 5 | Ink 6 | Ink 7 |
|---|---|---|---|---|---|---|---|
| Receiver 1 | 0.96 | 1.26 | 1.12 | 1.2 | 1.03 | 1.23 | 1.33 |
| Receiver 2 | 0.97 | 1.25 | 1.18 | 1.18 | 1.04 | 1.25 | 1.35 |
| Receiver 3 | 1.03 | 1.24 | 1.17 | 1.18 | 1.07 | 1.25 | 1.33 |
| Receiver 4 | 0.86 | 1.22 | 1.06 | 1.18 | 0.91 | 1.1 | 1.32 |
| Receiver 5 | 0.95 | 1.26 | 1.18 | 1.15 | 1.01 | 1.19 | 1.34 |
| Receiver 6 | 1.09 | 1.3 | 1.22 | 1.2 | 1.2 | 1.33 | 1.34 |
| Receiver 7 | 0.93 | 1.22 | 1.14 | 1.15 | 0.97 | 1.19 | 1.31 |

TABLE 6-continued

Status A Optical Densities of Inks Printed onto Plain Paper Receivers at 100% dot coverage

| Receiver/Ink | Ink 1 | Ink 2 | Ink 3 | Ink 4 | Ink 5 | Ink 6 | Ink 7 |
|---|---|---|---|---|---|---|---|
| Receiver 8 | 1.01 | 1.27 | 1.2 | 1.2 | 1.1 | 1.29 | 1.36 |
| Receiver 9 | 0.98 | 1.23 | 1.17 | 1.17 | 1.05 | 1.26 | 1.33 |
| Receiver 10 | 0.98 | 1.28 | 1.17 | 1.2 | 1.04 | 1.24 | 1.36 |
| Receiver 11 | 0.97 | 1.26 | 1.14 | 1.17 | 1.04 | 1.26 | 1.35 |
| Receiver 12 | 0.94 | 1.25 | 1.12 | 1.16 | 1.04 | 1.2 | 1.37 |

TABLE 7

Plain Paper Receiver Description

| Receiver | Plain Paper Receiver Description |
|---|---|
| Receiver 1 | Great White MultiUse 20 Paper |
| Receiver 2 | Xerox Premium Multipurpose Paper, 92 Bright, 20# |
| Receiver 3 | HammerMill Enhanced Multipurpose Office Paper, 20# |
| Receiver 4 | HP Multipurpose Paper, 92 Bright, 20# |
| Receiver 5 | OJI A4 |
| Receiver 6 | HP Advanced Multipurpose Paper, 92 Bright, 20# |
| Receiver 7 | Georgia Pacific IJ Paper, 92 Bright, 24# |
| Receiver 8 | Kodak Bright White IJ Paper, 110+ Bright, 24# |
| Receiver 9 | HP Color IJ Paper, 100+ Bright, 24# |
| Receiver 10 | Xerox Extra Bright IJ Paper, 95 Bright, 24# |
| Receiver 11 | Gerogia Pacific IJ Paper, 94 Bright, 24# |
| Receiver 12 | Staples IJ Paper, 102 Bright, 24# |

The results in table 6 illustrate that high densities may be obtained when polymeric colorants of the present invention are formulated into inkjet inks and printed onto a wide variety of plain paper substrates.

Water Fastness

Polymeric colorants 10 and 26 and comparative polymeric colorants 1 and 2 were formulated at 5% concentration in inks according to the above-described procedure and printed on plain paper receivers described in Table 7. Comparative polymeric colorants 1 and 2 are representative of those known in prior art. The water fastness was evaluated by measuring the Status A optical density before and after holding the printed image under running water for 30 seconds. The loss of optical density after this treatment is summarized in table 8.

These examples illustrate the highly improved water-fastness of the novel colorants when applied as inks to a wide variety of plain papers used in the art as evidenced by the very low loss in printed density.

TABLE 8

Waterfastness of Polymeric Colorants Printed on Plain Paper Receivers

| | % density loss | | | |
|---|---|---|---|---|
| Plain paper substrate | Polymeric Colorant 10 | Comparative Polymeric Colorant 1 | Polymeric Colorant 26 | Comparative Polymeric Colorant 2 |
| Receiver 1 | 1 | 16 | 2 | 31 |
| Receiver 2 | 0 | 37 | 1 | 35 |
| Receiver 3 | 0 | 47 | 2 | 41 |
| Receiver 4 | 1 | 14 | 2 | 22 |
| Receiver 5 | 1 | 5 | 2 | 23 |
| Receiver 6 | 1 | 0 | 0 | 32 |
| Receiver 7 | 2 | 45 | 1 | 39 |
| Receiver 8 | 1 | 65 | N/A | N/A |
| Receiver 9 | 3 | 54 | 1 | 53 |
| Receiver 10 | 1 | 10 | 0 | 17 |
| Receiver 12 | 1 | 26 | 2 | 35 |
| Average loss | 1.09 | 29.30 | 0.75 | 34.07 |

The invention claimed is:

1. An ink composition comprising a polymeric colorant in a carrier, wherein the polymeric colorant is represented by General Formula I:

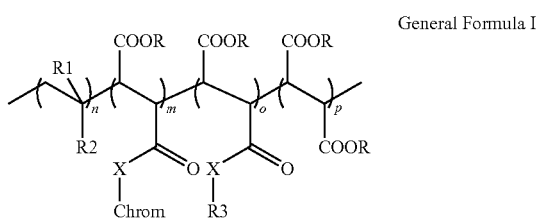

General Formula I wherein:
R is independently hydrogen or a monovalent cation;
R1 and R2 we independently selected from H, alkyl and aryl groups;
each X is independently: O, N, O—R4-O, N—R4-O, O—R4-S, or an N—R4-S group, wherein R4 is selected from any alkyl, aryl, or heteroatom-containing aromatic or aliphatic ring groups;
n, m, o and p represent the molar fractions of the distinct molecular units resulting from the reaction of the maleic anhydride units of the copolymer with specified reactants;
where m+o+p=1, m=0.05–0.7, o=0.1–0.8, and p=0–0.5, where n is a number between 1 and 6;
Chrom is a dye chromophore; and
R3 is selected from any branched, linear or cyclic alkyl group having from 8 to 24 carbons.

2. An ink composition of claim 1, wherein X is N or O and R3 is any, branched, liner or cyclic alkyl group having from 8 to 20 carbons.

3. An ink composition of claim 1, wherein X is N or O and R3 is any branched, linear or cyclic alkyl group having from 10 to 18 carbons.

4. An ink composition of claim 1 wherein the polymeric colorant is not covalently bonded to a pigment surface.

5. An ink composition of claim 4 wherein the ink composition does not contain a pigment.

6. An ink composition of claim 4, wherein X is N or O and R3 is any, branched, linear or cyclic alkyl group having from 8 to 20 carbons.

7. An ink composition of claim 4, wherein X is N or O and R3 is any branched, linear or cyclic alkyl group having from 10 to 18 carbons.

8. An ink composition of claim 1 comprising water as a carrier.

9. An ink composition of claim 1, wherein the polymeric colorant is present at between 0.1 and 20.0 weight percent of the total ink composition.

10. An ink jet printing method comprising the steps of:
providing an ink jet printer that is responsive to digital data signals;
loading the printer with an ink jet recording element comprising an uncoated or coated ink receiving substrate;
loading the printer with an ink jet ink composition comprising a polymeric colorant of claim 1; and
printing on the image receiving element using the ink jet composition in response to the digital data signals.

11. The printing method of claim 10 wherein the ink receiving substrate is a coated or uncoated paper.

12. The printing method of claim 10 wherein the ink receiving substrate is a non-porous substrate.

13. A polymeric colorant of General Formula I:

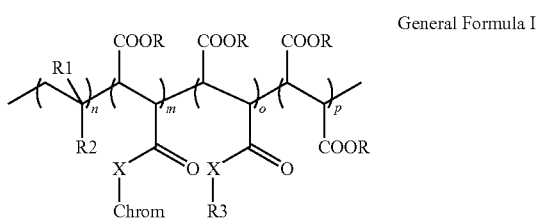

General Formula I wherein;
R is independently hydrogen or a monovalent cation;
R1 and R2 are independently selected from H, alkyl and aryl groups;
each X is independently: O, N, O—R4-O, N—R4-O, O—R4-S, or, and N—R4-S group, wherein R4 is selected from any alkyl, aryl, or heteroatom-containing aromatic or aliphatic ring groups;
n, m, o and p represent the molar fractions of the distinct molecular units resulted from the reaction of the maleic anbydride units of the copolymer with specified reactants;
where m+o+p=1, m=0.05–0.7, o=0.1–0.8, p=0–0.5, where n is a number between 1 and 6;
Chrom is a dye chromophore; and
R3 is selected from any branched, linear or cyclic alkyl group having from 8 to 24 carbons.

14. A printed media containing a deposit of the polymeric colorant of claim 13.

15. A polymeric colorant of claim 13 wherein the polymeric colorant is not covalently bonded to a pigment surface.

16. A polymeric colorant of claim 13 wherein p=0.1–0.5.

17. An ink composition comprising a polymeric colorant in a carrier, wherein the polymeric colorant is represented by General Formula I:

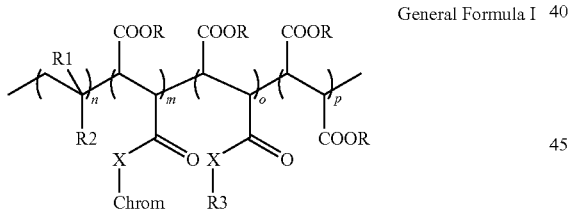

General Formula I wherein:
R is independently hydrogen or a monovalent cation;
R1 and R2 are independently selected from H, alkyl and aryl groups;
each X is independently: O, N, O—R4-O, N—R4-O, O—R4-S, or an N—R4-S group, wherein R4 is selected from any alkyl, aryl, or heteroatom-containing aromatic or aliphatic ring groups;
n, m, o and p represent the molar fractions of the distinct molecular units resulting from the reaction of the maleic anhydride units of the copolymer wit specified reactants;
where m+o+p=1, m=0.05–0.7, o=0.1–0.8, and p=0.1–0.5, where n is a number between 1 and 6;
Chrom is a dye chromophore; and
R3 is selected from any branched, linear or cyclic alkyl group having from 8 to 24 carbons.

18. A printed media containing a deposit of an ink represented by General Formula I:

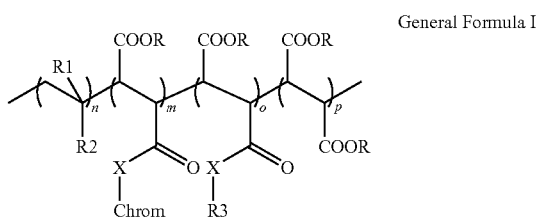

General Formula I wherein:
R is independently hydrogen or a monovalent cation;
R1 and R2 are independently selected from H, alkyl and aryl groups;
each X is independently: O, N, O—R4-O, N—R4-O, O—R4-S, or an N—R4-S group, wherein R4 is selected from any alkyl, aryl, or heteroatom-containing aromatic or aliphatic ring groups;
n, m, o and p represent the molar fractions of the distinct molecular units resulting from the reaction of the maleic anhydride units of the copolymer with specified reactants;
where m+o+p=1, m=0.05–0.7, o=0.1–0.8, and p=0.1–0.5, where n is a number between 1 and 6;
Chrom is a dye chromophore; and
R3 is selected from any branched, linear or cyclic alkyl group having from 8 to 24 carbons.

* * * * *

UNITED STATES PATENT AND TRADEMARK OFFICE
CERTIFICATE OF CORRECTION

PATENT NO. : 7,732,509 B2  Page 1 of 1
APPLICATION NO. : 11/509138
DATED : June 8, 2010
INVENTOR(S) : Madaras It is certified that error appears in the above-identified patent and that said Letters Patent is hereby corrected as shown below:

In Column 26, line 18 (Claim 1), delete "we" and insert -- are --.

In Column 26, line 34 (Claim 2), delete "any, branched, liner" and insert -- any branched, linear --.

In Column 26, line 45 (Claim 6), delete "any," and insert -- any --.

In Column 27, line 23 (Claim 13), delete "anbydride" and insert -- anhydride --.

In Column 28, line 11 (Claim 17), delete "wit" and insert -- with --.

Signed and Sealed this

Thirtieth Day of November, 2010

David J. Kappos
*Director of the United States Patent and Trademark Office*